(12) United States Patent
Liang et al.

(10) Patent No.: US 7,576,349 B2
(45) Date of Patent: Aug. 18, 2009

(54) RADIATION IMAGE READOUT APPARATUS

(75) Inventors: Rongguang Liang, Penfield, NY (US); Mark E. Shafer, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 284 days.

(21) Appl. No.: 11/316,851

(22) Filed: Dec. 23, 2005

(65) Prior Publication Data

US 2007/0145310 A1    Jun. 28, 2007

(51) Int. Cl.
*G03C 5/16* (2006.01)
(52) U.S. Cl. ..................................................... 250/580
(58) Field of Classification Search ................. 250/580, 250/582, 584, 585, 586, 370.08, 370.09, 250/578.1, 234, 208.1
See application file for complete search history.

(56) References Cited

U.S. PATENT DOCUMENTS

| | | | |
|---|---|---|---|
| 2,742,817 A | 4/1956 | Altman | |
| 3,910,684 A | 10/1975 | Glatzel | |
| 4,171,871 A | 10/1979 | Dill et al. | |
| 4,391,494 A | 7/1983 | Hershel | |
| 5,105,079 A | 4/1992 | Boutet et al. | |
| 5,777,789 A * | 7/1998 | Chiu et al. | 359/494 |
| 6,373,074 B1 | 4/2002 | Mueller et al. | |
| 6,813,098 B2 | 11/2004 | Mercado | |
| 6,863,403 B2 | 3/2005 | Mercado et al. | |
| 7,128,420 B2 * | 10/2006 | Kapellner et al. | 353/38 |
| 2001/0028047 A1 | 10/2001 | Isoda | |
| 2002/0040972 A1 | 4/2002 | Arakawa | |
| 2002/0096653 A1 | 7/2002 | Karasawa | |
| 2004/0125352 A1 | 7/2004 | Mercado | |
| 2004/0239893 A1 | 12/2004 | Mercado et al. | |
| 2005/0061999 A1 | 3/2005 | Saccomanno et al. | |

FOREIGN PATENT DOCUMENTS

EP       1 482 328      12/2004

\* cited by examiner

*Primary Examiner*—David P Porta
*Assistant Examiner*—Faye Boosalis

(57) ABSTRACT

A radiation readout apparatus includes: a concave mirror defining a central optical axis; a refractive lens assembly spaced from the concave mirror and symmetrical with the optical axis; an optical assembly which is optically coupled to the refractive lens assembly; a color filter for filtering out leaked stimulating radiation; and a dichroic prism optically coupled to the optical assembly for directing a linear stimulating radiation beam of a first wavelength, which is projected into the dichroic prism from the system, to a stimulable phosphor at the stimulable phosphor location, wherein stimulated radiation of a second wavelength emitted by the stimulable phosphor is passed back through the dichroic prism through the optical assembly, through the refractive lens assembly, reflected from the concave mirror, passed back through the refractive lens assembly, through the optical assembly, through the color filter, and to a linear sensor located at the sensor location.

30 Claims, 19 Drawing Sheets

RADIATION IMAGE READOUT APPARATUS

FIELD OF THE INVENTION

This invention relates in general to computed radiography (CR) imaging systems for reading images, such as radiography images, exposed in stimulable phosphors and more particularly to stimulated radiation image readout apparatus that is compact, has high collection efficiency, has improved image quality, and has a large field of view.

BACKGROUND OF THE INVENTION

Computed radiography (CR) systems using stimulable phosphors enjoy broad acceptance as clinical imaging tools. In a CR system, a stimulable phosphor is exposed to an image-wise pattern of short wavelength radiation, such as X-ray radiation, to record a latent image in the stimulable phosphor. The latent image is read out by stimulating the phosphor with stimulating radiation of a first wavelength, such as red or infrared light. Upon stimulation, the stimulable phosphor emits stimulated radiation of a second wavelength, such as blue or violet light, representative of the latent radiographic image. To produce a signal useful in digital image processing, in one well known flying spot technique, the stimulable phosphor is scanned in a raster pattern, by a beam of light, produced for example, by a laser reflected by an oscillating or rotating mirror. The stimulated radiation from the phosphor is sensed by a photodetector, such as one or more photomultiplier tubes, to produce electronic image signals. (See: U.S. Pat. No. 5,105,079 (Boutet et al.)). Although suitable for the applications intended, such image readout systems are large and complex and produce only a single point of image data at a time.

More recent CR systems have improved upon this earlier technique by providing a full line of image data at a time, offering advantages of faster throughput and lower cost and complexity over flying spot scanners. As just one example, U.S. Pat. No. 6,373,074 B1 (Mueller et al.) is directed to a CR system that scans a full line of image data points at a time. FIG. 1 shows the basic components of such a system. As shown, system 10 includes a linear light source 12, typically using an array of laser diodes or other light sources, which directs a linear scanning beam 14 onto a stimulable phosphor sheet 16 that has been irradiated and stores a latent X-ray image. One or more cylindrical lenses 18 are used to direct the highly asymmetric linear output beam along a line 20 on the surface of phosphor sheet 16. In a sensing head 22, collection optics 24 then directs the stimulated light from line 20 on phosphor sheet 16 through an optical filter 26 and to a linear photodetector array 28, typically a charge-coupled device (CCD) array. Phosphor sheet 16 is indexed in direction D by a transport mechanism (not shown) to provide a page scanning motion. In this way, phosphor sheet 16 is moved past sensing head 22 to detect each line of the image stored thereon. The sensed image data is then processed by an image processor 30 that assembles a two-dimensional output image from each successive sensed line. The output image can then be stored, transmitted to another location, or displayed.

While there have been numerous improvements to apparatus and methods for obtaining the stored image on a stimulable phosphor, there is still a need for increased efficiency and overall image quality. One widely recognized problem with existing CR readers relates to the need for improved image quality at image sensing circuitry (generally represented as linear photodetector array 28 in FIG. 1). The apparatus disclosed in US Patent Publication Nos. 2002/0096653 (Karasawa); 2001/0028047 (Isoda); 2002/0040972 (Arakawa), and in the above referenced U.S. Pat. No. 6,373,074, and elsewhere, for example, employ Selfoc™ lenses and provide 1:1 imaging. While this solution allows compact packaging of the sensing components and their support optics, it imposes a constraint on numerical aperture (NA). The Selfoc™ gradient index lens is characterized as having a low NA. The maximum f/# value for this type of lens is typically about f/2, which provides an NA of 0.25. Because collection efficiency of this lens is proportional to the square of the NA value, a low NA can significantly degrade overall system brightness. Yet another disadvantage of existing systems relates to the relatively low fill factor of the Selfoc™ lens array. Gaps between adjacent Selfoc™ lens elements limit the fill factor and further constrain light collection.

As a result of the overall inefficiency of the collection optics, the signal-to-noise ratio (SNR) of conventional sensing systems is disappointing. Collecting light over a broader area, such as disclosed in US Patent Application Publication No. 2001/0028047 noted above, tends to further degrade the SNR relationship, even when using two-channel sensing optics. Low collection efficiency also constrains the reading speed of the stimulable phosphor reader.

The photolithography system disclosed in the following patents is also of interest: U.S. Pat. No. 4,391,494 (Hershel), U.S. Pat. No. 6,813,098 B2 (Mercado), U.S. Pat. No. 6,863,403 B2 (Mercado et al.), US Patent Application Publication 2004/0125352 A1 (Mercado). The optical system disclosed in these patents is illustrated in FIG. 2. Optical system 38 includes a concave spherical mirror 40, an aperture stop AS1 located at the mirror, and a composite, achromatic plano-convex doublet lens-prism assembly 42. Mirror 40 and assembly 42 are disposed symmetrically about an optical axis 44. Optical system 38 is essentially symmetrical to aperture stop AS1 located at mirror 40 so that the system is initially corrected for coma, distortion, and lateral color. All of the spherical surfaces in optical system 38 are nearly concentric. In optical system 38, doublet-prism assembly 42 includes a meniscus lens 43A, a plano-convex lens 43B and symmetric fold prisms 45A and 45B. In conjunction with mirror 40, assembly 42 corrects the remaining optical aberrations. Symmetric fold prisms 45A and 45B are used to attain sufficient working space for movement of a reticle 46 and a wafer 48 located at respective object plane OP1 and image plane IP1. A beam of light 49 is transmitted through reticle 46 and the reticle image is transmitted by optical assembly 42 and mirror 40 to wafer 48.

The optical system discussed above has the following characteristics: (1) In order to minimize the aberration of the system, the system is large and heavy; (2) The objective of the system requires transmissive illumination; (3) The illumination light and the light collected by the system are the same, i.e., have the same wavelength. The latter characteristics limit this system's application to a stimulable phosphor radiation readout system because of the following requirements of the latter system: (1) Stimulable phosphor radiation readout requires reflection illumination; (2) Readout of the stimulable phosphor is carried out by stimulating radiation of a wavelength different than the wavelength of the readout stimulated radiation; (3) The stimulable phosphor readout system requires the filtering of the stimulating radiation from the photodetection system; (4) The stimulable phosphor readout system should be compact and lightweight.

The following patents disclose various optical systems that are of interest. U.S. Pat. No. 2,742,817 (Altman); U.S. Pat. No. 3,910,684 (Glatzel); U.S. Pat. No. 4,171,871 (Dill et al.)

There is thus a need for a radiation readout apparatus that is simple and compact, that has high image quality, that has high collection efficiency, and that has a large field of view.

SUMMARY OF THE INVENTION

According to the present invention there is provided a radiation readout apparatus which solves the problems and meets the needs discussed above.

According to a feature of the present invention there is provided radiation readout apparatus comprising:

a concave mirror defining an optical axis;

a refractive lens assembly spaced from the concave mirror and symmetrical with the optical axis;

an optical assembly which is optically coupled to the refractive lens assembly and to a stimulable phosphor location on one side of the optical axis and to a linear sensor location on the other side of the optical axis;

a stimulating radiation beam delivery system including a stimulating radiation beam source for producing a stimulating radiation beam of a first wavelength and beam shaping elements;

a color filter, located at the linear sensor location, for filtering out leaked stimulating radiation;

a dichroic prism optically coupled to the optical assembly for directing a linear stimulating radiation beam of the first wavelength from the stimulating radiation beam delivery system, which is projected into the dichroic prism, to a stimulable phosphor at said stimulable phosphor location, wherein stimulated radiation of a second wavelength emitted by the stimulable phosphor is passed back through said dichroic prism through said optical assembly, through said refractive lens assembly, reflected from the concave mirror, passed back through the refractive lens assembly, through said optical assembly, through the color filter, and to a linear sensor located at the sensor location.

The radiation readout apparatus of the present invention is simple and compact, has high image quality, has high collection efficiency, and has a large field of view.

DETAILED DESCRIPTION OF THE INVENTION

Figure 1:
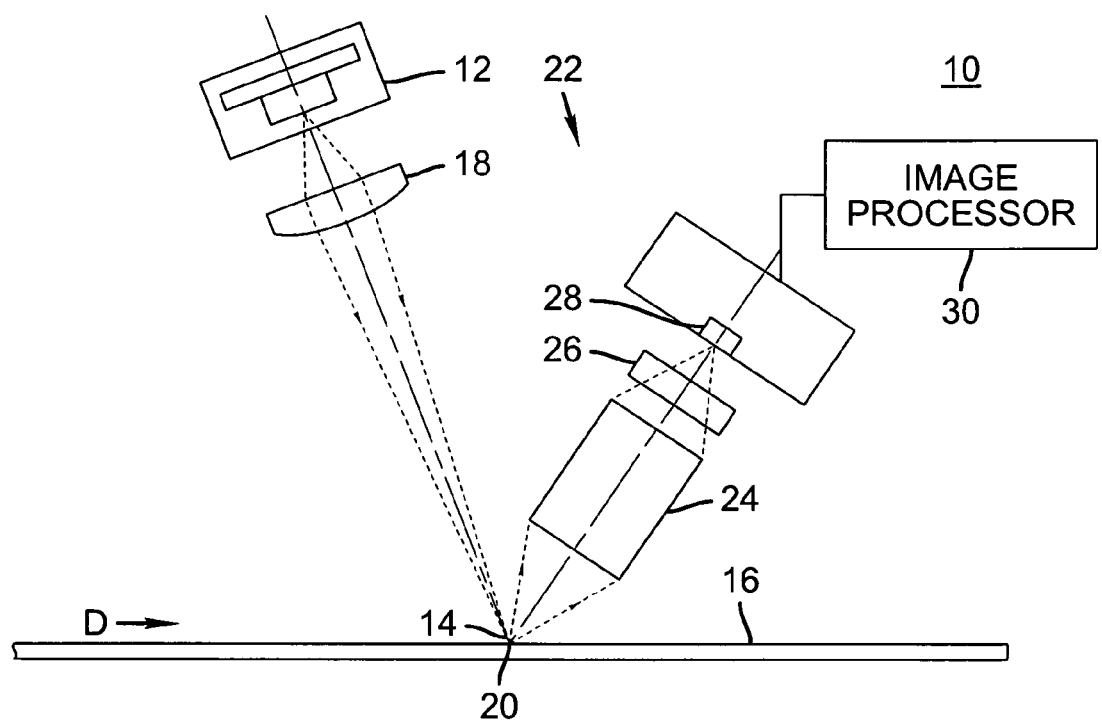
FIG. 1 is a diagrammatic view of a known imaging system.
Figure 2:
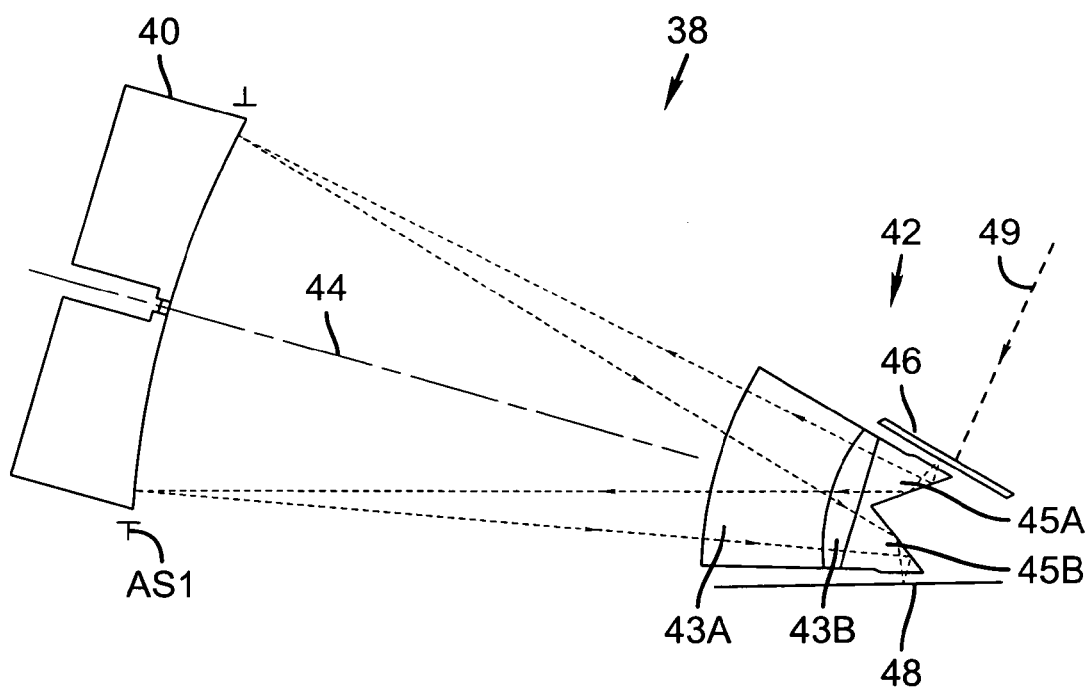
FIG. 2 is a diagrammatic view of another known imaging system.
Figure 3:
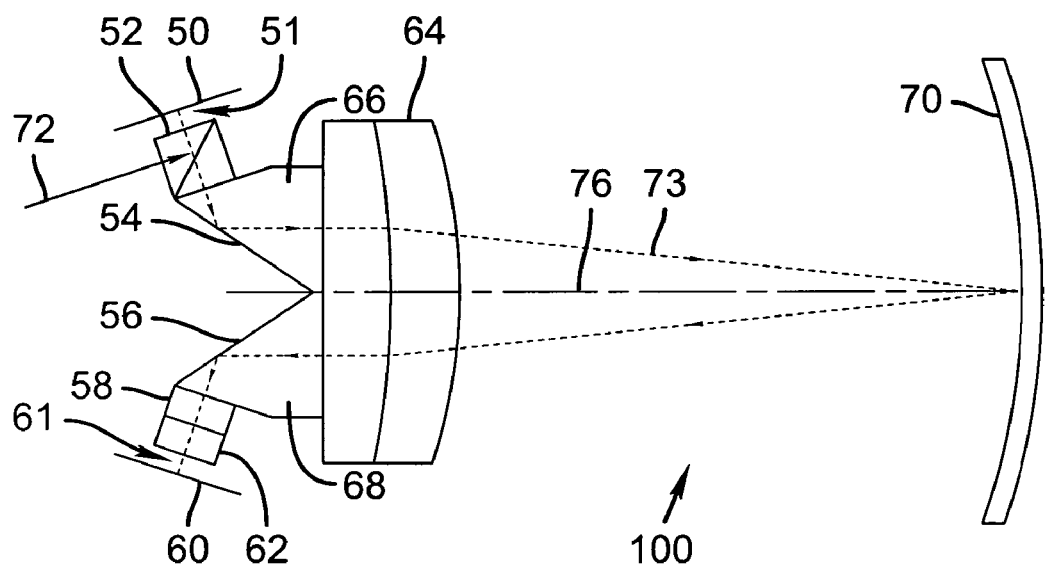
FIGS. 3 and 4 are respective diagrammatic and perspective views of an embodiment of the present invention.
Figure 4:
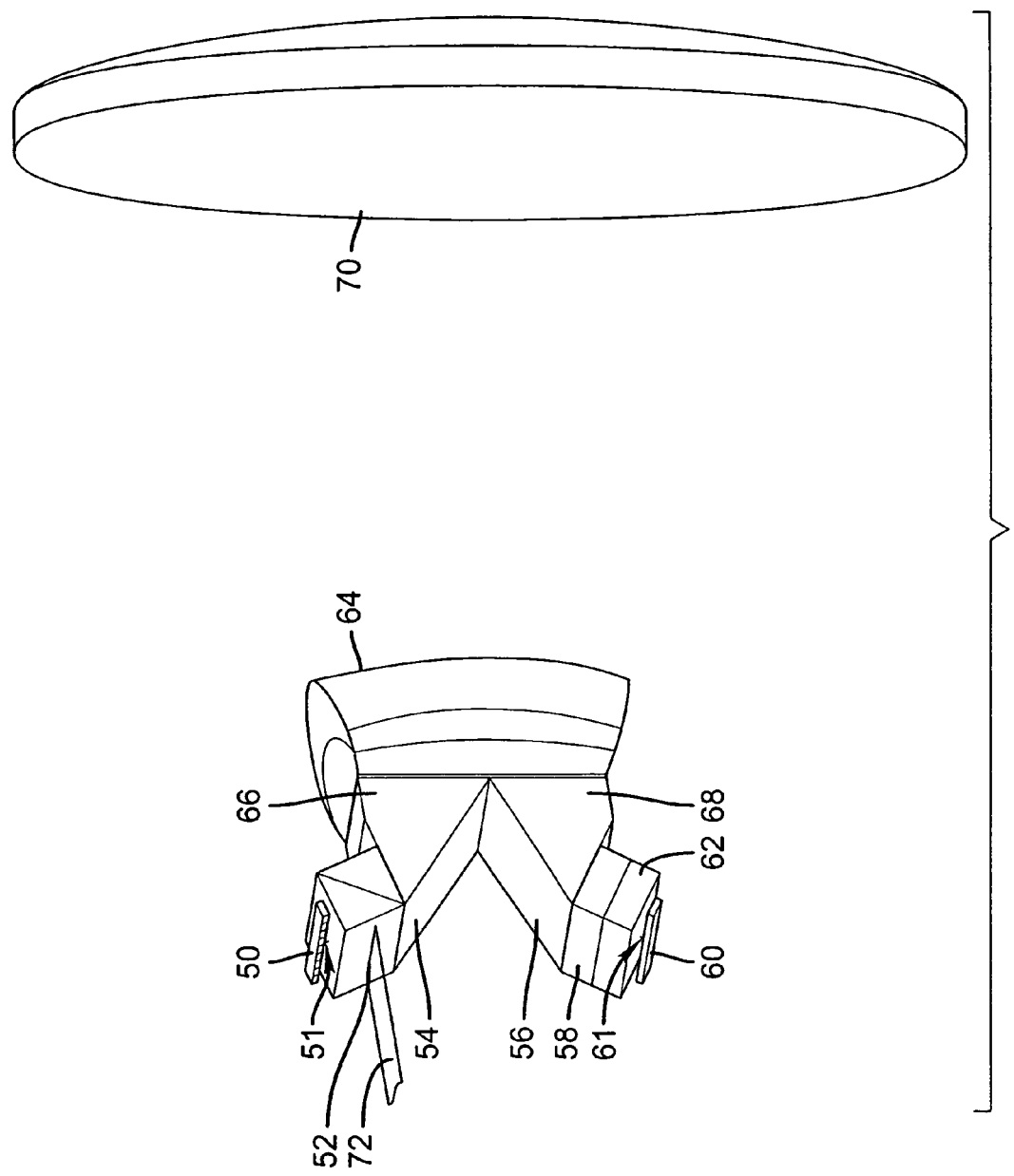

Referring now to the Figures, there are shown preferred embodiments of the present invention. As shown in FIGS. 3 and 4, there is shown a stimulable phosphor radiation readout apparatus according to one embodiment of the present invention. Readout apparatus 100 includes, a concave spherical mirror 70, a refractive lens assembly including a doublet lens 64, and an optical assembly including prisms 66 and 68, optical plate 58, and color filter 62, and dichroic prism 52. Mirror 70, lens 64, prisms 66 and 68 are symmetrical about central axis 76 which defines a central plane. Dichroic prism 52 has a cutoff wavelength and reflects radiation of a first wavelength above the cutoff wavelength, and passes radiation of a second wavelength below the cutoff wavelength. A line of stimulating radiation of a first wavelength from a stimulating radiation source is projected along path 72 into dichroic prism 52 which reflects the stimulating radiation to stimulable phosphor 50 located at stimulable phosphor location 51. The latent radiographic image stored in phosphor 50 emits stimulated radiation of a second wavelength which passes through dichroic prism 52 along path 73, through prism 66 off surface 54, through lens 64, is reflected off mirror 70, passes through lens 64 again, and then through prism 68 reflected off surface 56, and through optical plate 58, color filter 62 and to linear sensor 60 at sensor location 61. Color filter 62 filters out leaked stimulating radiation from the dichroic prism 52. Sensor 60 is a linear array of photodetectors such as a CCD or CMOS array. With this embodiment, the prisms 66 and 68 are designed so that stimulated radiation from the stimulated phosphor meets the total internal reflection (TIR) condition at the surfaces 54 and 56 and reflects without any loss.

Figure 5:
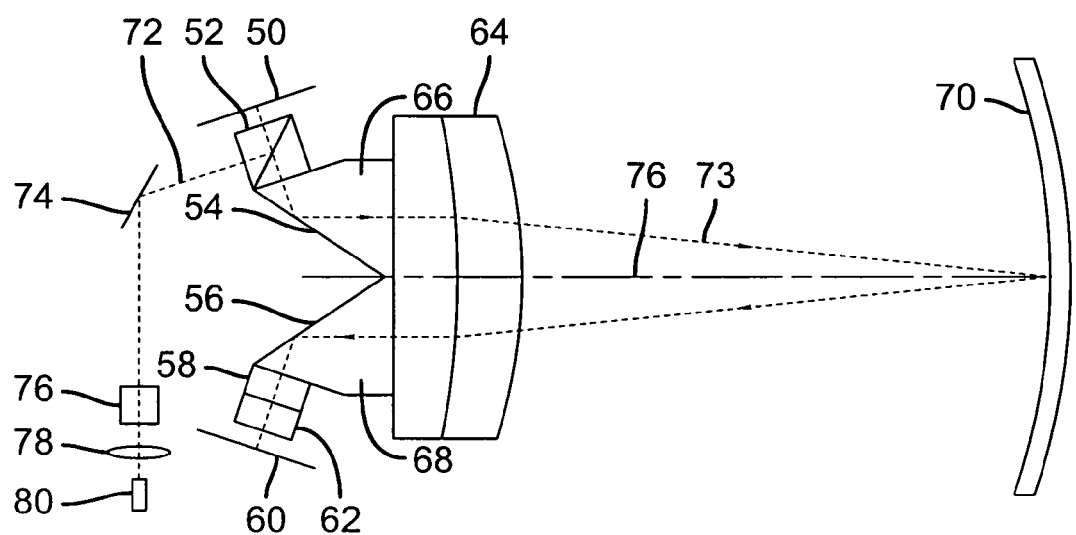
FIG. 5 is a diagrammatic view showing the embodiment of FIG. 3 with a laser stimulating radiation source.

FIG. 5 is a diagrammatic view of a stimulating radiation source 80 such as one or an array of diode laser or other kind of laser, emitting a radiation beam which is collimated by collimator 78. The collimated radiation passes through beam shaping optics 76 which shapes the beam into a line with a uniform line width and uniform beam profile. Mirror 74 redirects the line beam into dichroic beam splitter 52.

Figure 6:
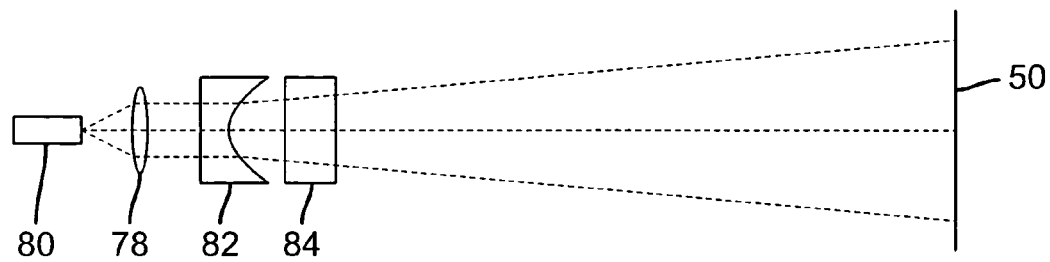
FIGS. 6 and 7 are respective plan and elevational diagrammatic views of a version of the laser source shown in FIG. 5.
Figure 7:
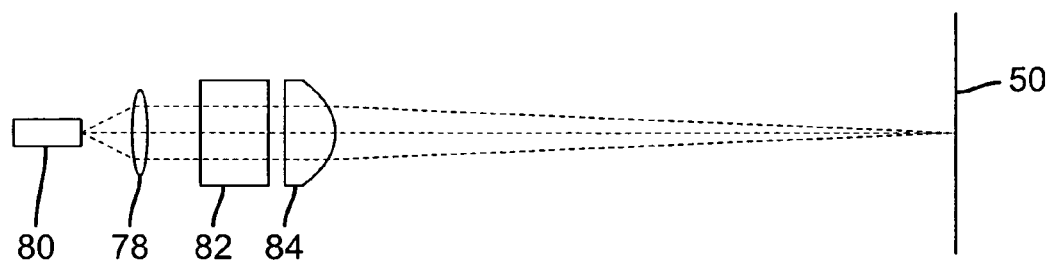

The beam shaping optics 76 can include one or more elements, such as aspherical cylindrical lenses or lenslet array. FIGS. 6 and 7 are respective plan and elevation views of one version of stimulating beam delivery system using aspherical cylindrical lenses. As shown, the stimulating beam delivery system includes a first aspherical cylindrical lens 82 which expands the radiation beam along one dimension, and a, second aspherical or conventional cylindrical lens 84 which focuses or converges the beam onto the phosphor along a second dimension perpendicular to the first dimension. The aspherical cylindrical lens is used to redistribute the collimated beam so that the irradiation along the line is uniform. With conventional cylindrical lenses, the irradiation along the line is not uniform and falls off quickly.

Figure 8:
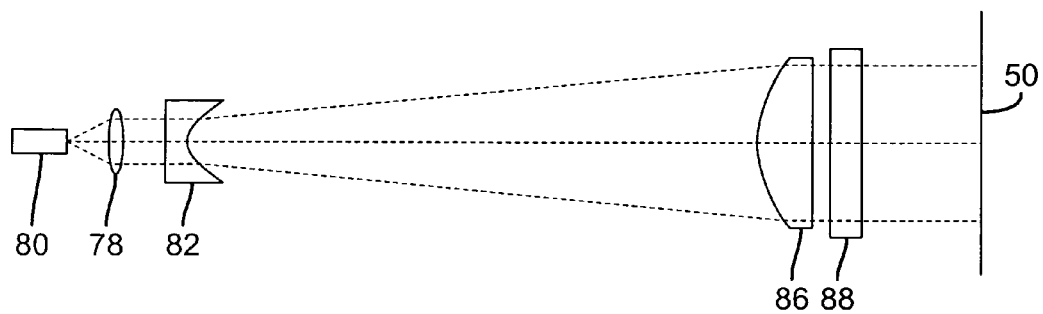
FIGS. 8 and 9 are respective plan and elevational diagrammatic views of another version of the stimulating radiation beam delivery system shown in FIG. 5.
Figure 9:
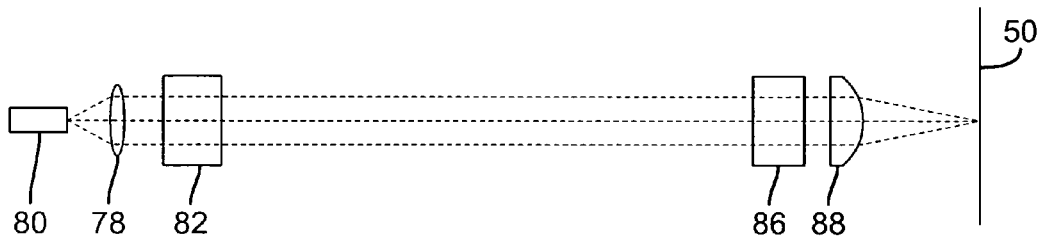

FIGS. 8 and 9 are respective plan and elevation views of a telecentric version of a stimulating radiation beam delivery system using aspherical cylindrical lenses. Aspherical cylindrical lens 82 is located next to collimator 78 and expands and redistributes the radiation beam along one direction, as in the version shown in FIGS. 6 and 7. The other optical elements 86 and 88 are located distant from lens 82 and closer to the phosphor. Optical element 86 collimates the expanded beam in the direction expanded by optical element 82, and then optical element 88 focuses the beam onto the phosphor. In the FIGS. 6 and 7 version the stimulating radiation beam in the line direction is shown in FIG. 7 as diverging at the phosphor 50. The advantage of using the telecentric stimulating beam of FIGS. 8 and 9 is that the incident angle is the same along the stimulating line, which means each point in the phosphor will have the same excitation characteristics.

Figure 10:
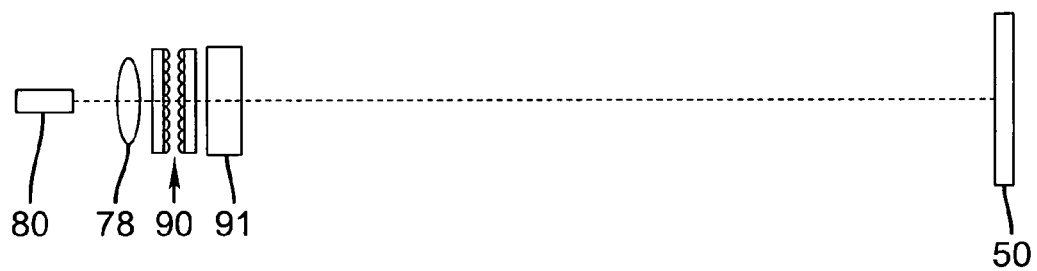
FIG. 10 is a plan diagrammatic view of a further version of the stimulating radiation beam delivery system shown in FIG. 5.

FIG. 10 is a diagrammatic view of a stimulating beam delivery system using a cylindrical lenslet array. As shown, laser 80 produces a radiation beam which is collimated by collimator 78. Lenslet array 90 and combination lens 91 form the laser beam into a line of stimulating radiation of given length which is directed onto phosphor 50. The principle of the cylindrical lenslet array beam shaping system is that the first lenslet array divides the collimated beam into sub beams, and the second lenslet array together with the combination lens 91, focus the sub beam from the first lenslet array into a line on the phosphor plane. The stimulating line from each lenslet overlaps on the phosphor plane so that the resulting stimulating line is very uniform. One of the advantages of the beam shaping system using a lenslet array is that it can be used for more than one radiation source. More optical elements can be added into the stimulating radiation beam delivery system. For example, a field lens can be located close to the phosphor 50, so that the stimulating radiation beam is telecentric.

Figure 11:
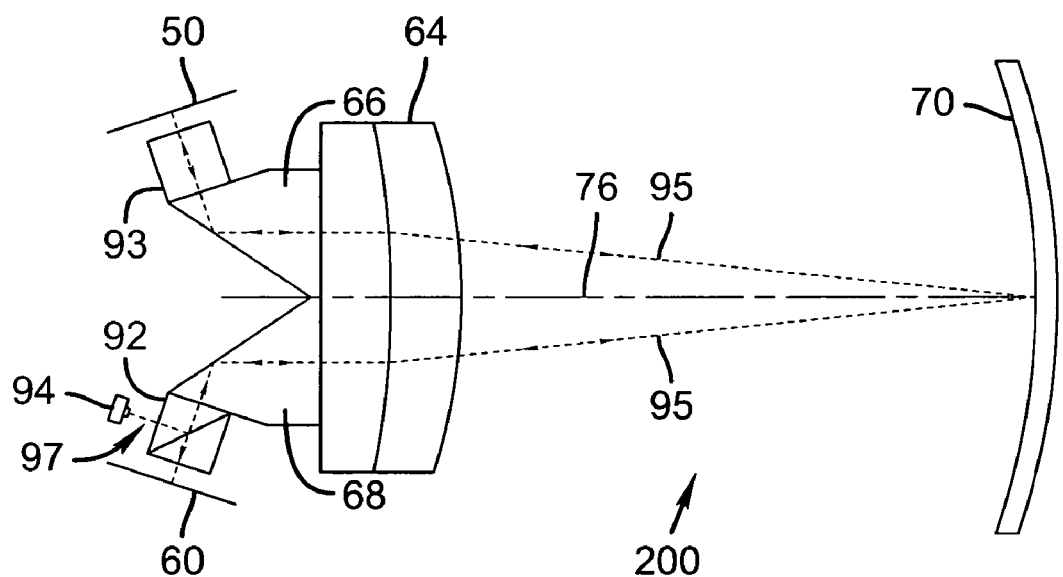
FIG. 11 is a diagrammatic view of another embodiment of the present invention.

FIG. 11 is a diagrammatic view of another embodiment of the present invention using an LED radiation source rather than a laser radiation source. As shown, radiation readout apparatus 200 includes concave mirror 70, doublet lens 64 having prisms 66 and 68, optical element 93 and dichroic prism 92. The color filter is not shown in this figure. Dichroic prism 92 reflects radiation at wavelengths including a first wavelength and passes radiation at wavelengths including a second wavelength. The radiation source 94 is a linear array of LEDS (Light Emitting Diodes) that project a linear beam of stimulating radiation of the first wavelength into dichroic prism 92, which reflects the linear beam along path 95 through prism 68 and doublet lens 64, reflected off of concave mirror 70, back through doublet lens 64, through prism 66 and optical element 93 onto stimulable phosphor 50. In front of the LED array 94, a narrow rectangular slit 97 is placed at the plane conjugated to the phosphor 50. This slit is used to create a linear radiation beam from the LED array 94. The stimulated radiation of the second wavelength emitted by phosphor 50 is directed along path 95 in the opposite direction through optical element 93, prism 66, and doublet lens 64, reflected from mirror 70 through lens 64, prism 68 and dichroic prism 92 to linear sensor 60. This embodiment takes advantage of this symmetrical, unit magnification system. With the careful choice of glass materials, the system can be used in the spectrum including the first and second wavelengths. In the embodiment shown in FIG. 11, the optical system will image the rectangular slit in front of the LED radiation source 94 to the phosphor 50. With this concept, the stimulating radiation beam size can be adjusted by changing the size of the rectangular slit 97.

Figure 12:
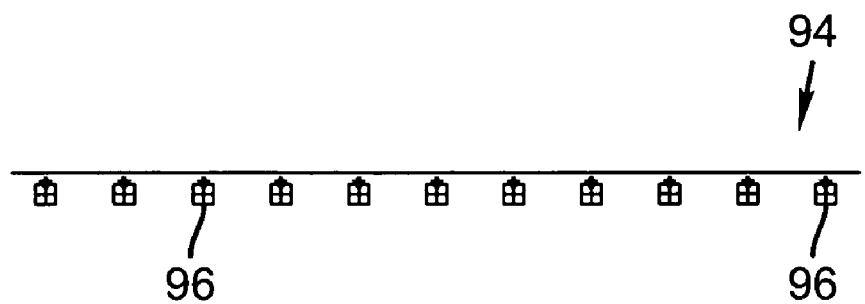
FIGS. 12 and 13 are diagrammatic views of LED arrays useful with the embodiment of FIG. 11.
Figure 13:
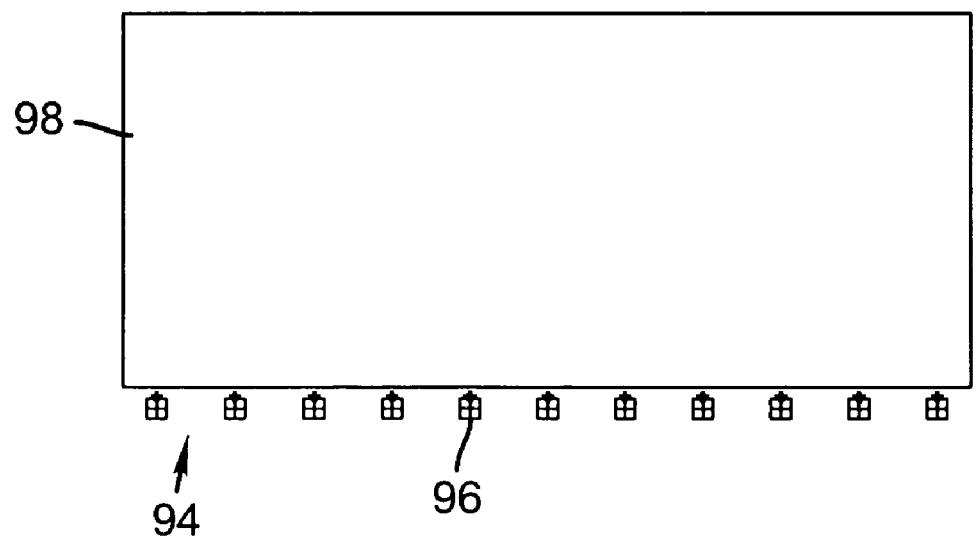

FIG. 12 shows LED array 94 as including a number of LEDs 96 in a linear array. A difficulty can arise if an LED should malfunction, leaving a gap in the line of illumination. This can result in image degradation at portions of the phosphor 50 where this diminished illumination occurs. This difficulty can be remedied by the assembly shown in FIG. 13 which includes a homogenizing optical plate 98. Plate 98 conditions the incident radiation from LEDs 96 to provide a uniformized linear illumination of essentially uniform irradiance at the output of plate 98. Thus, if an LED should malfunction, the illumination on phosphor 50 will be less but still uniform, avoiding image degradation.

Figure 14:
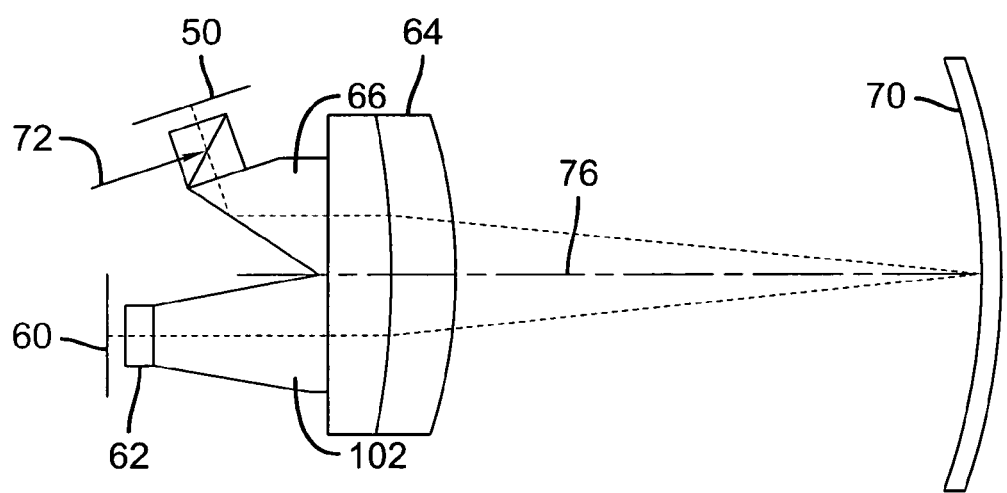
FIG. 14 is a diagrammatic view of another embodiment of the present invention.

FIG. 14 shows a modification of the apparatus shown in FIGS. 3 and 4, wherein the prism 68 is replaced by straight optical element 102. The other components and function are the same. This modification provides more packaging options.

Figure 15:
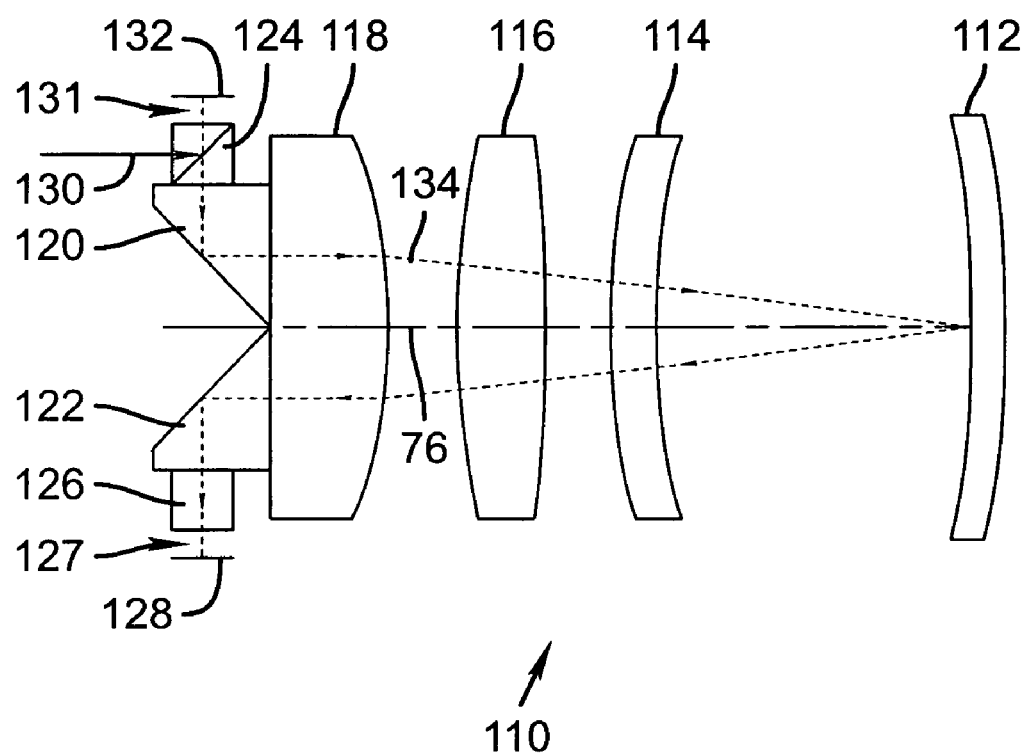
FIGS. 15 and 16 are diagrammatic and perspective views of another embodiment of the present invention.
Figure 16:
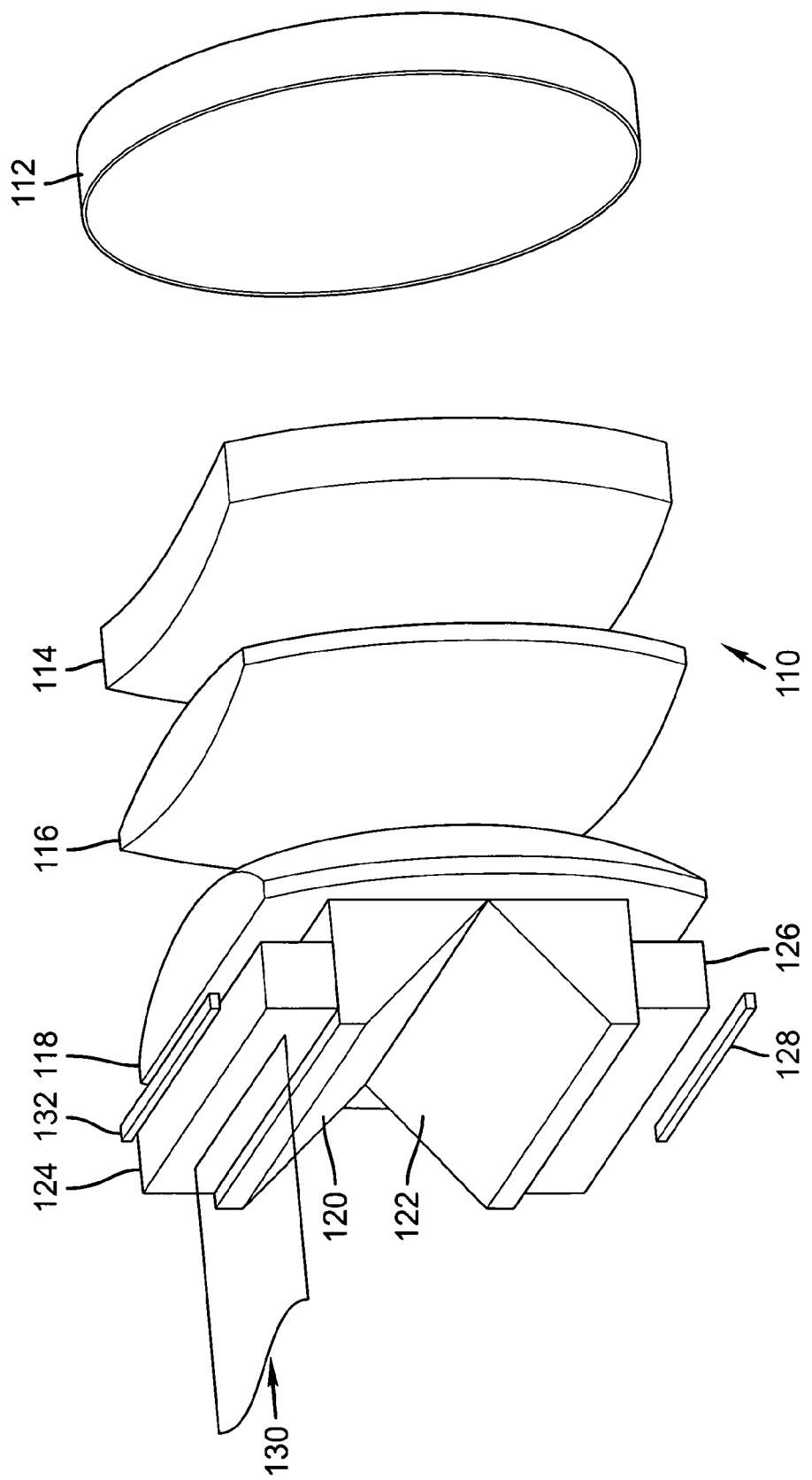

FIGS. 15 and 16 show another embodiment of the present invention that is more compact than the embodiment of FIGS. 3 and 4. With the same field of view and numerical aperture, this compact system is about half the size of the system shown in FIG. 3. This design breaks the concentric condition which the system shown in FIG. 3 has. As shown, stimulable phosphor radiation readout apparatus 110 includes concave mirror 112, a refractive lens assembly including spaced negative lens 114, positive lens 116, and positive lens 118, an optical assembly including prisms 120 and 122, and color filter 126, and dichroic prism 124. A linear beam 130 of stimulating radiation of a first wavelength from a radiation source is projected into dichroic prism 124 onto stimulable phosphor 132 located at phosphor location 131. Phosphor 132 which stores a latent image, emits a linear beam of stimulated radiation of a second wavelength. The stimulated radiation beam of the second wavelength is directed along a path 134 passing through prisms 124 and 120, lenses 118, 116, and 114, reflected from mirror 112, passing through lenses 114, 116, and 118, prism 122, and color filter 126 to linear sensor 128 at sensor location 127, which converts the stimulated radiation beam into an electronic signal. It will be understood that in this embodiment, more, or less than two positive lenses may be used, and more than one negative lens may be used to minimize the aberration.

Figure 17:
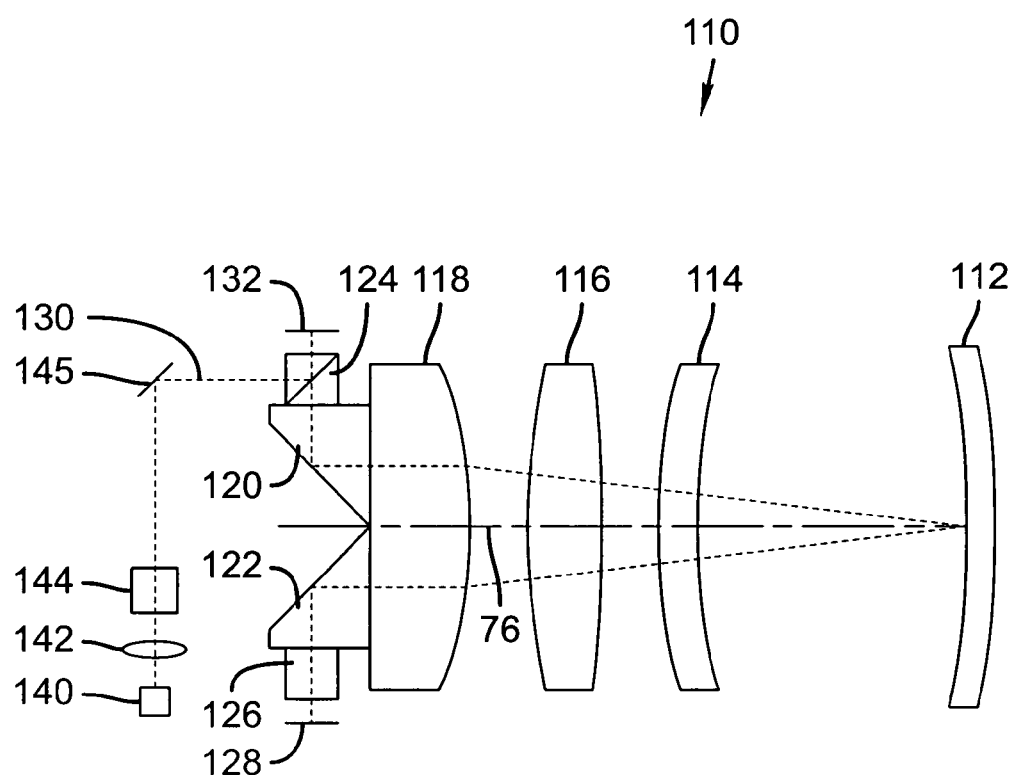
FIGS. 17 and 18 are diagrammatic views showing the embodiment of FIG. 15 with different versions of the stimulating radiation beam delivery system.
Figure 18:
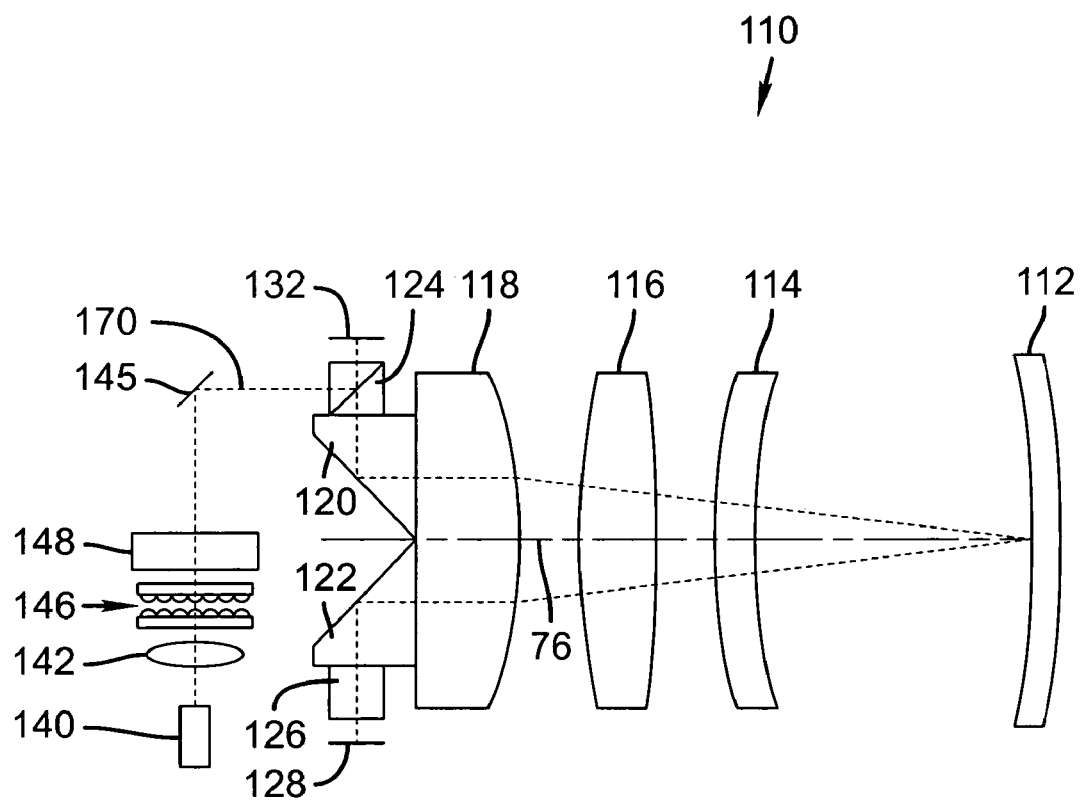

FIG. 17 shows the radiation readout system using a laser as the stimulating radiation beam source and a aspherical cylindrical lens as the beam shaping element. As shown, beam 130 is produced by laser 140, collimating lens 142, cylindrical lens assembly 144 and is reflected off mirror 145 to dichroic prism 124. The working principle of this type of stimulating radiation beam delivery system is discussed relating to FIGS. 7 and 8. FIG. 18 shows another readout system using a cylindrical lenslet array as the beam shaping element. As shown, beam 130 is produced by laser 140, collimating lens 142, lenslet array 146, optical element 148 and reflected off mirror 145 to dichroic prism 124. Again, the working principle using a lenslet array is discussed in detail relating to FIG. 10.

Figure 19:
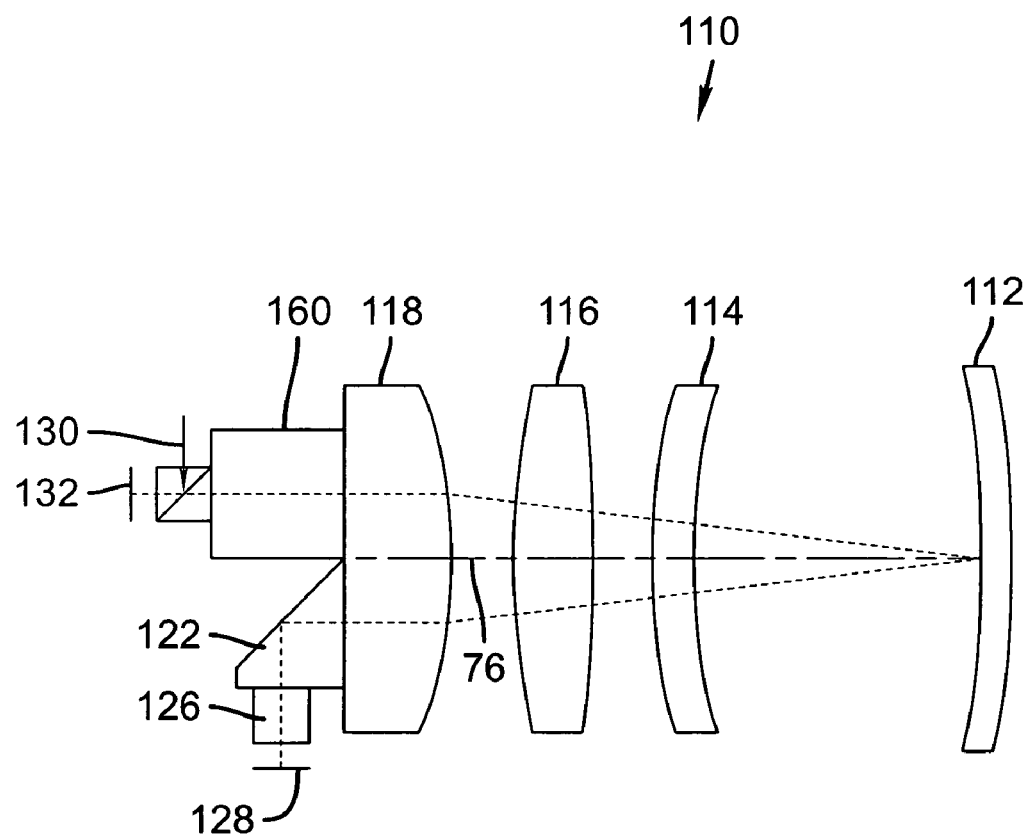
FIGS. 19 and 20 are further embodiments of the present invention.
Figure 20:
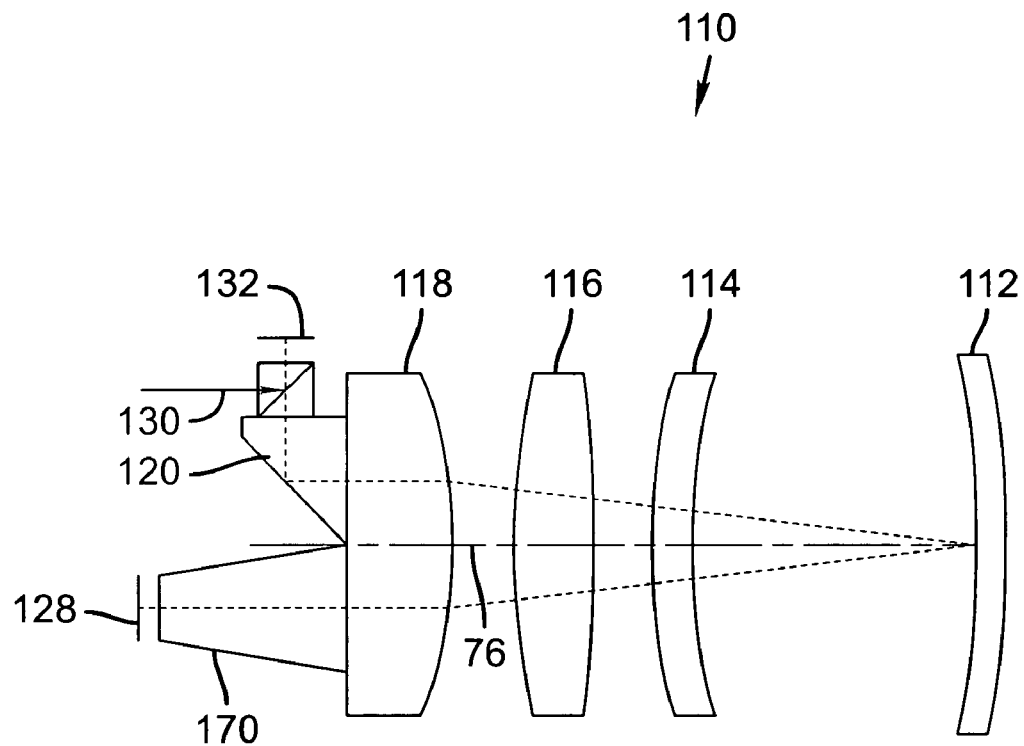

FIG. 19 is a modification of the embodiment of FIGS. 15 and 16 in which prism 120 is replaced by optical element 160. The other components and function are the same. FIG. 20 is another modification of the embodiment of FIGS. 15 and 16 in which prism 122 is replaced by a platel 70. With different prisms used in FIGS. 19 and 20, there are more options for mechanical and electronics packaging, such as the electronics board orientation.

Figure 21:
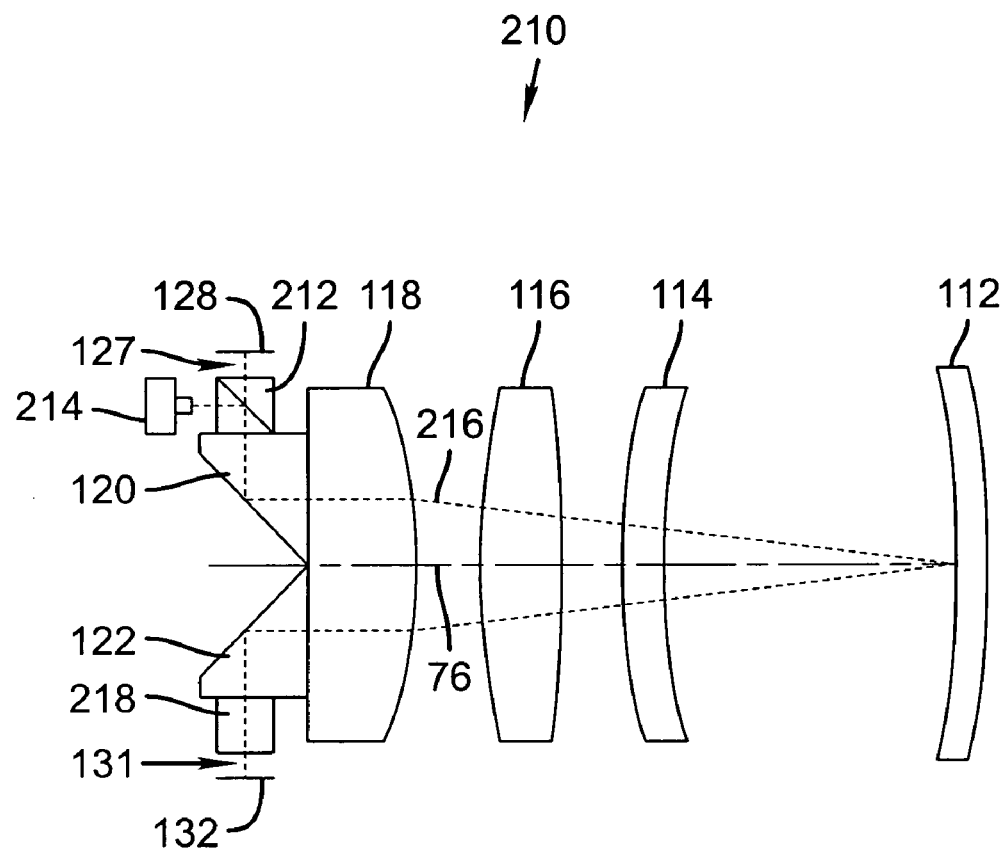
FIGS. 21 and 22 are diagrammatic and perspective views of another embodiment of the present invention.
Figure 22:
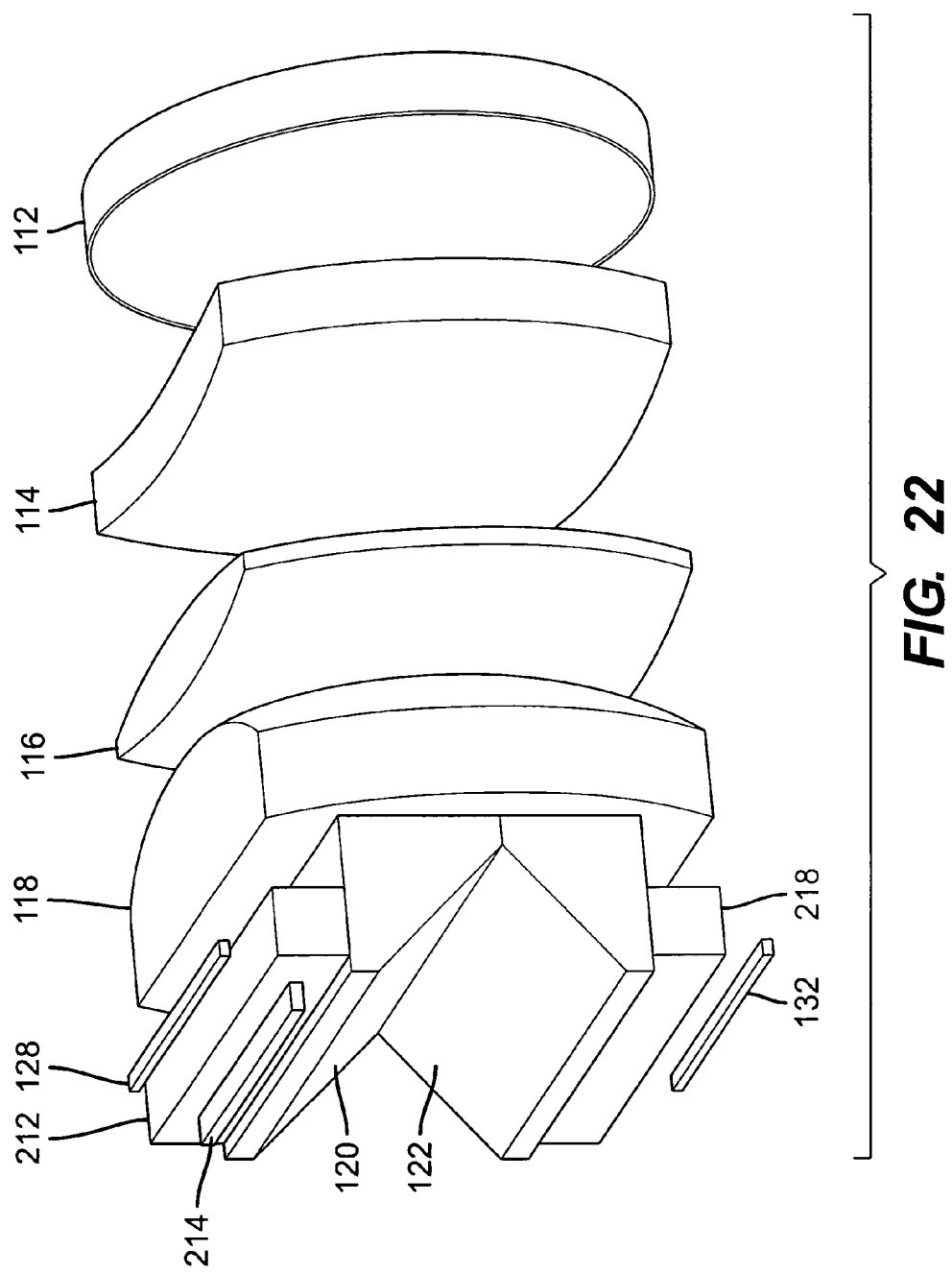

FIGS. 21 and 22 show another embodiment of the present invention. As shown, stimulable phosphor radiation readout apparatus 210 includes concave mirror 112, a refractive lens assembly including, negative refractive lens 114, positive refractive lens 116, and positive refractive lens 118, an optical assembly including prisms 120 and 122 and optical element 218, and dichroic prism 212. A linear beam of stimulating radiation of a first wavelength from LED array 214 is projected into dichroic prism 212 along a path 216 through prism 120, through lenses 118, 116, 114, reflected from concave mirror 112, back through lenses 114, 116, 118, prism 122 and optical element 218 to stimulable phosphor 132 located at phosphor location 131. Stimulable phosphor 132 emits stimulated radiation of a second wavelength, different than the first wavelength, which passes back through element 218, prism 122, lenses 118, 116, 114, reflected from mirror 112, passes through lenses 114, 116, 118, prism 120 and dichroic prism 212 to linear sensor 128 at sensor location 127. As discussed in relation to FIG. 11, the system can be designed as a achromatic system so that the aberration in first and second wavelengths are minimized The dimension of the linear beam described above can be either the full width of a stimulable phosphor to be scanned or of a smaller dimension, in which case the apparatus would be moved across the width of the stimulable phosphor to scan the entire phosphor dimension. In either case either the apparatus can be moved relative to the stimulable phosphor or the stimulable phosphor can be moved relative to the apparatus The invention has been described in detail with particular reference to certain preferred embodiments thereof, but it will be understood that variations and modifications can be effected within the scope of the invention.

PARTS LIST

10 CR system
12 linear light source
14 linear scanning beam
16 stimulable phosphor sheet
18 cylindrical lens
20 line of linear output beam
22 sensing head
24 collection optics
26 optical filter
28 linear photodetector array
30 image processor
38 optical system
40 concave spherical mirror
42 achromatic plano-convex doublet lens-prism assembly
44 optical axis
43A meniscus lens
43B plano-convex lens
45A symmetrical fold prism
45B symmetrical fold prism
46 reticle
48 wafer
49 beam of light
50 stimulable phosphor
51 stimulable phosphor location
52 dichroic prism
54 prism surface
56 prism surface
58 optical plate
60 sensor
61 sensor location
62 color filter
64 lens
66 prism
68 prism
70 mirror
72 path
73 path
74 mirror
76 central optical axis
78 collimator
80 stimulating radiation source
82 first aspherical cylinder lens
84 second aspherical cylinder lens
86 optical element
88 optical element
90 lenslet array
91 combination lens
92 dichroic prism
93 optical element
94 LED array (radiation source)
95 path
96 LED
97 rectangular slit
98 homogenizing optical plate
100 radiation readout apparatus
102 straight optical element
110 radiation readout apparatus
112 concave spherical mirror
114 negative lens
116 positive lens
118 positive lens
120 prism
122 prism
124 dichroic prism
126 color filter
127 sensor location
128 linear sensor
130 linear beam
131 phosphor location
132 stimulable phosphor
134 path
140 laser
142 collimating lens
144 cylindrical lens assembly
145 mirror
146 lenslet array
148 optical element
160 optical element
170 plate
210 radiation readout apparatus
212 dichroic prism
214 LED array
216 path
218 optical element

The invention claimed is:

1. A radiation readout apparatus comprising:
a concave mirror defining a central optical axis;
a refractive lens assembly spaced from said concave mirror and symmetrical with said optical axis;
an optical assembly which is optically coupled to said refractive lens assembly and to a stimulable phosphor location on one side of said optical axis and to a linear sensor location on the other side of said optical axis;
a stimulating radiation beam delivery system including a stimulating radiation beam source for producing a stimulating radiation beam of a first wavelength and beam shaping elements;
a color filter, located at said linear sensor location, for filtering out leaked stimulating radiation; and
a dichroic prism optically coupled to said optical assembly for directing a linear stimulating radiation beam of said first wavelength from said stimulating radiation beam delivery system, which is projected into said dichroic prism, to a stimulable phosphor at said stimulable phosphor location, wherein stimulated radiation of a second wavelength emitted by said stimulable phosphor is passed back through said dichroic prism through said optical assembly, through said refractive lens assembly, reflected from said concave mirror, passed back through said refractive lens assembly, through said optical assembly, through said color filter, and to a linear sensor located at said sensor location.

2. The apparatus of claim 1 wherein said concave mirror is a spherical concave mirror.

3. The apparatus of claim 1 wherein said refractive lens assembly includes a positive refractive doublet lens.

4. The apparatus of claim 1 wherein said refractive lens assembly includes at least one positive refractive lens and at least one negative refractive lens spaced from said positive refractive lens.

5. The apparatus of claim 1 wherein said refractive lens assembly includes first and second spaced positive refractive lenses and one negative refractive lens spaced from said positive refractive lenses.

6. The apparatus of claim 1 wherein said optical assembly includes first and second prisms symmetrically located on opposite sides of said optical axis respectively in optical communication with said stimulable phosphor location and with said linear sensor location, wherein said dichroic prism is in contact with said first prism, and wherein said dichroic prism reflects said stimulating radiation beam directly to a stimulable phosphor locatable at said phosphor location.

7. The apparatus of claim 1 wherein said stimulating radiation beam source includes a laser source for producing said stimulating radiation beam.

8. The apparatus of claim 7 wherein said laser source includes a laser, a collimating lens, and beam shaping optics to form the beam produced by said laser into a linear beam.

9. The apparatus of claim 8 wherein said beam shaping optics includes one or more aspherical cylindrical lenses.

10. The apparatus of claim 8 wherein said beam shaping optics includes a lenslet array.

11. The apparatus of claim 1 wherein said optical assembly includes first and second prisms symmetrically located on opposite sides of said optical axis respectively in optical communication with said stimulable phosphor location and with said linear sensor location, wherein said dichroic prism is in contact with said second prism at said sensor location, and wherein said dichroic prism directs said stimulating radiation beam through said second prism, through said refractive lens assembly, reflected from said concave mirror, back through said refractive lens assembly, through said first prism to a stimulable phosphor locatable at said phosphor location.

12. The apparatus of claim 1 wherein said stimulating radiation beam source includes a linear array of light emitting diodes for producing said stimulating radiation beam.

13. The apparatus of claim 1, wherein the color filter filters out substantially all stimulating radiation contacted thereby regardless of wavelength.

14. The apparatus of claim 1, wherein the color filter is disposed optically adjacent to said linear sensor.

15. The apparatus of claim 1, wherein the color filter is disposed optically downstream of the stimulable phosphor.

16. The apparatus of claim 1, the color filter blocking radiation reflected by the stimulable phosphor.

17. The apparatus of claim 1, wherein the linear sensor is disposed in a plain conjugate the stimulable phosphor.

18. The apparatus of claim 1, wherein the linear sensor obtains an illuminated image of a line.

19. The apparatus of claimi, wherein the linear stimulating radiation beam does not intersect the color filter.

20. The apparatus of claim 1, wherein the linear stimulating radiation of said first wavelength forms the leaked stimulating radiation at the dichroic prism.

21. The apparatus of claim 20, wherein the dichroic prism directs the leaked stimulating radiation away from the stimulable phosphor such that the leaked stimulating radiation does not intersect the stimulable phosphor.

22. The apparatus of claim 20, wherein the leaked stimulating radiation passes through said optical assembly and said refractive lens assembly, is reflected from said concave mirror, and is passed back through said refractive lens assembly and said optical assembly.

23. A radiation readout apparatus comprising:
a concave mirror defining a central optical axis;
a refractive lens assembly including a positive refractive doublet lens which is spaced from said concave mirror and symmetrical with said optical axis;
first and second prisms contacting said doublet lens and symmetrically located on opposite sides of said optical axis in optical communication respectively with a stimulable phosphor location and a linear sensor location;
a dichroic prism in contact with said first prism;
a color filter, located at said linear sensor location, for filtering out leaked stimulating radiation; and
a radiation source including one of a laser source and a linear array of light emitting diodes for producing a linear beam of stimulating radiation of a first wavelength that is projected into said dichroic prism and reflected by said dichroic prism directly to a stimulable phosphor located at said phosphor location, wherein stimulated radiation of a second wavelength emitted by said stimulable phosphor is passed back through said dichroic prism through said first prism, through said refractive lens assembly, reflected from said concave mirror, passed back through said refractive lens assembly, through said second prism and to a linear sensor located at said sensor location.

24. A radiation readout apparatus comprising:
a concave mirror defining a central optical axis;
a refractive lens assembly including a positive refractive doublet lens which is spaced from said concave mirror and symmetrical with said optical axis;
first and second prisms contacting said doublet lens and symmetrically located on opposite sides of said optical axis in optical communication respectively with a stimulable phosphor location and a linear sensor location;
a dichroic prism in contact with said second prism;
a color filter, located at said linear sensor location, for filtering out leaked stimulating radiation; and
a radiation source including one of a laser source and a linear array of light emitting diodes for producing a linear beam of stimulating radiation at a first wavelength which is projected into said dichroic prism, and wherein said dichroic prism directs said stimulating radiation beam through said second prism, through said refractive lens assembly, reflected from said concave mirror, back through said refractive lens assembly, through said first prism to a stimulable phosphor located at said phosphor location, wherein stimulated radiation of a second wavelength emitted by said stimulable phosphor is passed back through said first prism, through said refractive lens assembly, reflected from said concave mirror, passed back through said refractive lens assembly, through said second prism and said dichroic prism and to a linear sensor located at said sensor location.

25. A radiation readout apparatus comprising:
a concave mirror defining a central optical axis;
a refractive lens assembly including at least one positive refractive lens and at least one negative refractive lens which are spaced from one another and which are spaced from said concave mirror and symmetrical with said optical axis;

first and second prisms contacting said at least one positive refractive lens and symmetrically located on opposite sides of said optical axis in optical communication respectively with a stimulable phosphor location and a linear sensor location;

a dichroic prism in contact with said first prism;

a color filter, located at said linear sensor location, for filtering out leaked stimulating radiation; and a radiation source including one of a laser source and a linear array of light emitting diodes for producing a linear beam of stimulating radiation of a first wavelength that is projected into said dichroic prism and reflected by said dichroic prism directly to a stimulable phosphor located at said phosphor location, wherein stimulated radiation of a second wavelength emitted by said stimulable phosphor is passed back through said dichroic prism through said first prism, through said refractive lens assembly, reflected from said concave mirror, passed back through said refractive lens assembly, through said second prism and to a linear sensor located at said sensor location.

26. The apparatus of claim 25, wherein at least one of the at least one positive refractive lens and the at least one negative refractive lens comprises a non-concentric surface.

27. The apparatus of claim 25, wherein both the at least one positive refractive lens and the at least one negative refractive lens comprise a non-concentric surface.

28. The apparatus of claim 25, wherein the at least one negative lens is disposed between the at least one positive lens and the concave mirror.

29. A radiation readout apparatus comprising:

a concave mirror defining an central optical axis;

a refractive lens assembly including at least one positive refractive lens and at least one negative refractive lens which are spaced from one another and which are spaced from said concave mirror and symmetrical with said optical axis;

first and second prisms contacting said at least one positive refractive lens and symmetrically located on opposite sides of said optical axis in optical communication respectively with a stimulable phosphor location and a linear sensor location;

a dichroic prism in contact with said second prism;

a color filter, located at said linear sensor location, for filtering out leaked stimulating radiation; and a radiation source including one of a laser source and a linear array of light emitting diodes for producing a linear beam of stimulating radiation at a first wavelength which is projected into said dichroic prism, and wherein said dichroic prism directs said stimulating radiation beam through said second prism, through said refractive lens assembly, reflected from said concave mirror, back through said refractive lens assembly, through said first prism to a stimulable phosphor located at said phosphor location, wherein stimulated radiation of a second wavelength emitted by said stimulable phosphor is passed back through said first prism, through said refractive lens assembly, reflected from said concave mirror, passed back through said refractive lens assembly, through said second prism and said dichroic prism and to a linear sensor located at said sensor location.

30. The apparatus of claim 29, wherein the at least one negative lens is disposed between the at least one positive lens and the concave mirror.

* * * * *